United States Patent
Kageyama et al.

(10) Patent No.: US 7,064,281 B2
(45) Date of Patent: Jun. 20, 2006

(54) COMBINATION WEIGHING DEVICE

(75) Inventors: Toshiharu Kageyama, Shiga (JP);
Takumi Kawamura, Shiga (JP);
Yutaka Tamai, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 111 days.

(21) Appl. No.: 10/716,448

(22) Filed: Nov. 20, 2003

(65) Prior Publication Data
US 2004/0104054 A1    Jun. 3, 2004

(30) Foreign Application Priority Data
Nov. 29, 2002    (JP)    .......................... P2002-347065

(51) Int. Cl.
*G01G 19/387* (2006.01)

(52) U.S. Cl. .................... 177/25.18; 177/121

(58) Field of Classification Search ............. 177/25.18, 177/121
See application file for complete search history.

(56) References Cited

U.S. PATENT DOCUMENTS

| | | | | |
|---|---|---|---|---|
| 3,724,569 A | * | 4/1973 | Blodgett ........................ | 177/1 |
| 4,508,186 A | * | 4/1985 | Sashiki et al. .................. | 177/1 |
| 4,553,616 A | * | 11/1985 | Haze ............................. | 177/1 |
| 4,566,070 A | * | 1/1986 | Tanaka ........................ | 702/129 |
| 4,642,788 A | * | 2/1987 | Haze ........................... | 700/305 |
| 4,708,215 A | | 11/1987 | Nakamura et al. ............ | 177/25 |
| 5,054,652 A | * | 10/1991 | Oshima et al. ................. | 222/1 |
| 5,074,436 A | * | 12/1991 | Inoue ........................... | 222/56 |
| 5,756,939 A | * | 5/1998 | Taniguchi ................. | 177/25.18 |
| 5,854,446 A | | 12/1998 | Tatsuoka et al. .............. | 177/17 |
| 5,859,389 A | * | 1/1999 | Tatsuoka et al. ......... | 177/25.18 |
| 6,545,230 B1 | * | 4/2003 | Tamai et al. ............. | 177/25.18 |
| 2001/0020552 A1 | * | 9/2001 | Tamai et al. | |

FOREIGN PATENT DOCUMENTS

| | | | | |
|---|---|---|---|---|
| EP | 0362567 A2 | 4/1990 | | |
| EP | 0825424 A2 | 2/1998 | | |
| EP | 1134564 A2 | 9/2001 | | |
| JP | 05-256682 A | * | 10/1993 | .............. 177/25.18 |
| JP | 2003-240629 A | * | 8/2003 | .............. 177/25.18 |

* cited by examiner

*Primary Examiner*—Randy W. Gibson
(74) *Attorney, Agent, or Firm*—Staas & Halsey LLP (57) ABSTRACT

A combinational measuring device is provided with a radiation feeder transporting objects and a measuring hopper measuring the weight of each group of objects transported by the radiation feeder. As to each measuring hopper performing introduction by a prescribed frequency, an average operation part obtains an average and standard deviation of a transport quantity every group transported by the radiation feeder. On the basis of the obtained standard deviation, a parameter operation part determines whether or not the transport quantity per group transported by the radiation feeder is dispersed. The parameter operation part operates a control parameter so that the transport quantity per group transported by the radiation feeder reaches a target introduction value if the transport quantity per group transported by the radiation feeder is stable, while operating the control parameter so that the transport quantity per group transported by the radiation feeder is not in excess of a target measured value if the transport quantity per group transported by the radiation feeder is dispersed. The combinational measuring device controls driving of the radiation feeder on the basis of the obtained control parameter. Thus, it is possible to provide a combinational measuring device performing efficient measurement.

6 Claims, 7 Drawing Sheets

PARAMETER DATA 1 0 4

|  | STRENGTH CONTROL PARAMETER | TIME CONTROL PARAMETER |
|---|---|---|
| RADIATION FEEDER 5 a | Pr 1 a | Pr 2 a |
| RADIATION FEEDER 5 b | Pr 1 b | Pr 2 b |
| RADIATION FEEDER 5 n | Pr 1 n | Pr 2 n |

COMBINATION WEIGHING DEVICE

BACKGROUND OF THE INVENTION

1. Field of the Invention

The present invention relates to a combination weighing device combining objects having different weights with each other to reach a prescribed weight. More specifically, it relates to a technique of controlling the quantity of objects in a combination weighing device.

2. Description of the Background Art

In order to bag objects such as sweets or vegetables having different weights by a prescribed weight, a combination weighing device is employed for temporarily grouping the objects, measuring the weights of the groups and selecting a combination of groups exhibiting a total weight corresponding to the prescribed weight.

Briefly stated, a cross feeder of a general combination weighing device supplies objects to a dispersion feeder. The dispersion feeder dispersively discharges the supplied objects to a plurality of radiation feeders, which in turn introduce the objects into pool hoppers. The combination weighing device treats the objects introduced into each pool hopper as a group, and introduces the same into a measuring hopper every group. Each measuring hopper measures the weight of the group transported from the corresponding radiation feeder, and outputs the result of the measurement to a control part consisting of a CPU or the like. The control part selects the optimum combination of measuring hoppers storing objects exhibiting a total weight corresponding to a prescribed weight on the basis of the results of measurement received from the measuring hoppers and instructs the selected measuring hoppers to introduce the groups stored therein. The measuring hoppers instructed by the control part open on-off gates for introducing the groups into a collecting chute. The combination weighing device bags the plurality of groups introduced into the collecting chute through a discharge chute. In such a combination weighing device, the probability of presence of the optimum combination depends on how to control the weight of the group introduced into each measuring hopper.

Therefore, generally proposed is a combination weighing device controlling the manipulated variable for each radiation feeder thereby controlling the weight of a group of objects transported to each measuring hopper. For example, this combination weighing device previously sets the number of measuring hoppers introducing objects in one cycle among a plurality of measuring hoppers. In an initial state of operations or when no proper combination is obtained, the combination weighing device automatically controls the manipulated variable for each radiation feeder so that the weight of the group of objects introduced into each measuring hopper reaches an ideal weight (obtained by dividing a prescribed weight by the number of measuring hoppers introducing objects) of objects introduced by a single measuring hopper.

In such a combination weighing device, however, the weights of groups of objects introduced into the respective measuring hoppers may unidirectionally fluctuate due to fluctuation of a power supply line or unidirectional fluctuation of supplied states for the respective radiation feeders. When the combination weighing device controls the quantities of introduction into all measuring hoppers to reach the ideal weight as described above in this case, the objects introduced into all measuring hoppers exceed the ideal weight and the total weight of bagged objects exceeds a prescribed weight whichever measuring hoppers are combined with each other, for example. In other words, the probability of presence of combinations exhibiting quantities of bagged objects reaching a target measured value is remarkably reduced under this control when the aforementioned fluctuation takes place.

Therefore, proposed is a device controlling each radiation feeder to disperse the weight of a group of objects introduced into each measuring hopper about an ideal weight thereby maintaining the probability of presence of combinations when the aforementioned fluctuation takes place.

However, while the aforementioned device can deal with fluctuation of supplied states or the like, standard deviation of the weights of groups of objects introduced into respective measuring hoppers in a general state is so large that the probability of presence of combinations itself is disadvantageously low.

When the quantity of objects supplied to each radiation feeder is increased, there is a high possibility that an overscale state takes place in a measuring hopper corresponding to a radiation feeder having a relatively largely set manipulated variable since the radiation feeder is originally controlled to disperse the quantity of introduction.

When the overscale state takes place in the measuring hopper, the weight of a group of objects introduced into this measuring hopper is in excess of a target measured value, and the measuring hopper is unusable in this case.

SUMMARY OF THE INVENTION

The present invention relates to a combination weighing device combining objects having different weights with each other to reach a prescribed total weight.

More specifically, the present invention is directed to a technique of controlling the quantity of objects in a combination weighing device.

Accordingly, combination weighing device for weighing respective groups of objects to determine a partial combination of the groups of objects having a total weight approximating to a target combination weight according to a preferred embodiment of the present invention comprises: a plurality of transport elements transporting respective groups of objects; a transport quantity measuring element measuring weights of respective groups of objects transported by the plurality of transport elements; and a transport quantity control element controlling the weights of respective groups of objects on the basis of prescribed parameters. The transport quantity control element comprises: an operation element obtaining an average and standard deviation of weights of respective groups of objects corresponding to a prescribed frequency for each transport element on the basis of weights of respective groups of objects corresponding to the prescribed frequency measured by the transport quantity measuring element; and a parameter operation element operating the prescribed parameters on the basis of the average and the standard deviation of each transport element obtained by the operation element. The parameter operation element selects one of at least two operation techniques to operate prescribed parameter of each transport element in response to the standard deviation obtained by the operation element.

Thus, measurement efficiency can be improved.

The transport quantity control element controls driving strength for the plurality of transport elements thereby controlling weights of respective groups of objects. Thus, the transport quantity of the objects every group can be readily controlled.

The transport quantity control element controls driving time for the plurality of transport elements thereby controlling weights of respective groups of objects. Thus, the combination weighing device can readily control the transport quantity of the objects every group while widening the control range for the transport quantity as compared with a case of controlling only the driving strength.

The transport quantity control element further comprises a transport state detection element detecting an overscale state or an empty state of each transport quantity measuring element on the basis of the weights of respective groups of objects measured by the transport quantity measuring element. The parameter operation element selects one of at least two operation techniques in response to the result of detection of the transport state detection element.

Thus, the combination weighing device can maintain the present circumstances as to normally operating transport elements, thereby improving control efficiency.

Accordingly, an object of the present invention is to provide a combination weighing device capable of efficiently performing measurement by controlling the weight of a group of objects introduced into each measuring hopper not to be excessive.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
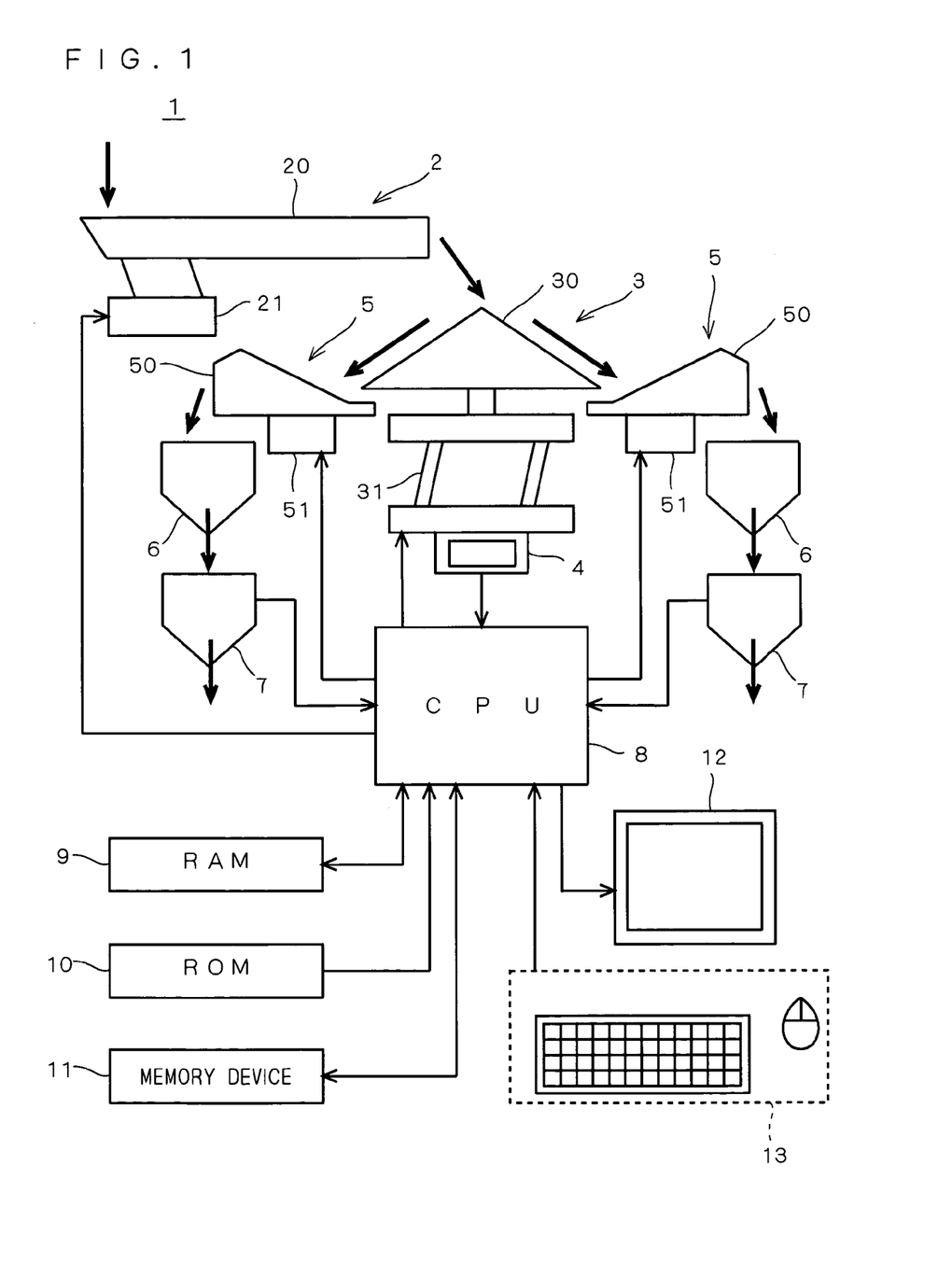
FIG. 1 illustrates the structure of a combination weighing device according to a first preferred embodiment of the present invention and the connectional relation between respective components of the structure.

FIG. 1 illustrates the structure of a combination weighing device 1 according to a first preferred embodiment of the present invention and the connectional relation between respective elements of the structure. The combination weighing device 1 comprises a cross feeder 2, a dispersion feeder 3, a measurer 4, a plurality of radiation feeders (radiation troughs) 5, pool hoppers 6 and measuring hoppers 7. The combination weighing device 1 also comprises a CPU 8, a RAM 9, a ROM 10 and a memory device 11 as components for mainly controlling the respective components 2 to 7. The combination weighing device 1 further comprises a display part 12 screen-displaying various data as an interface with an operator and an operation part 13 fir inputting instructions from the operator. The operation part 13, constituted of a keyboard, a mouse etc., may alternatively be formed by a touch panel display or the like also serving as the display part 12. The combination weighing device 1 is further provided with a collecting chute (not shown) receiving objects discharged from the measuring hoppers 7 and a discharge chute (not shown).

The combination weighing device 1 according to the first preferred embodiment is constituted of the aforementioned components 2 to 13 as a device for measuring the weights of objects such as sweets or fruits having different weights every group for combining the same with each other so that the total weight of a plurality of groups selected from a plurality of groups reaches a prescribed weight (hereinafter referred to as "target measured value Tg") and bagging the same. This combination weighing device 1 is also applicable to a boxer or a bottler employed for a similar object, as a matter of course.

The cross feeder 2 is constituted of a trough 20 receiving the objects supplied to the combination weighing device 1 thereon and a driving mechanism 21 driving the trough 20 in a prescribed direction. In this cross feeder 2, the driving mechanism 21 drives the trough 20 in the prescribed direction thereby transporting the objects supplied to the combination weighing device 1 (placed on the trough 20) to the dispersion feeder 3.

The dispersion feeder 3 is constituted of a dispersion table 30 supplied with the objects from the cross feeder 2 and a base 31 holding the dispersion table 30.

The dispersion table 30 has a substantially conical upper surface, and is supplied with the objects transported by the cross feeder 2 around the apex of the upper surface as shown by arrow in FIG. 1. The base 31 supports the dispersion table 30 on a prescribed position and vibrates/drives the same. The base 31 vibrates/drives the dispersion table 30 for radially moving the objects transported to the dispersion table 30 while dispersing the same in the peripheral direction of the upper surface of the dispersion table 30 as shown by arrows in FIG. 1. Then, the dispersion table 30 discharges the objects to the respective radiation feeders 5 radially arranged along the outer periphery thereof.

The measurer 4 having the function of a general scale for measuring weights measures the weight (hereinafter referred to as "dispersed weight") of the objects present on the dispersion table 30 at prescribed timing and outputs the result of the measurement to the CPU 8.

In the combination weighing device 1, the plurality of radiation feeders 5 are arranged along the periphery of a circular edge of the dispersion table 30. The dispersion feeder 3 dispersively radially transports the objects as hereinabove described, thereby dispersively discharging the objects to the respective radiation feeders 5.

Each radiation feeder 5 comprises a feeder part 50 receiving and transporting the objects and a driving mechanism 51, so that the driving mechanism 51 vibrates/drives the feeder part 50 thereby transporting the objects received by the feeder part 50 in a prescribed direction and introducing the same into a prescribed one of the pool hoppers 6. The driving mechanism 51 can change vibration strength for the feeder part 50 on the basis of a control signal (parameter data 104 in FIG. 2) from the CPU 8. Therefore, the combination weighing device 1 according to the first preferred embodiment can control the transport quantity of each radiation feeder 5 by adjusting the vibration strength for each driving mechanism 51.

Each pool hopper 6 temporarily holds the objects received from the corresponding radiation feeder 5 and thereafter opens an on-off gate (not shown) at prescribed timing thereby introducing the held objects into the corresponding measuring hopper 7 every group.

Each measuring hopper 7 holds the group of objects received from the corresponding pool hopper 6, measures the weight of the group and outputs the result of the measurement to the CPU 8. The measuring hopper 7 further opens an on-off gate (not shown) on the basis of a control signal from the CPU 8 thereby introducing the held group of objects into the collecting chute.

The combination weighing device 1 according to the first preferred embodiment previously sets a target number (hereinafter referred to as "target introduction number N") of the measuring hoppers 7 performing introduction in one cycle.

The combination weighing device 1 comprises the pool hoppers 6 and the measuring hoppers 7 in one-to-one correspondence to the radiation feeders 5 respectively. Thus, the CPU 8 can determine which radiation feeder 5 has transported the group of objects held by each measuring hopper 7 in the combination weighing device 1. In other words, the measuring hoppers 7 mainly correspond to the transport quantity measuring element in the present invention.

The CPU 8 is connected with the respective components of the combination weighing device 1 through an interface (not shown) and bus wires (not shown). The CPU 8 reads a program stored in the ROM 10 onto the RAM 9 and runs the same thereby performing prescribed operations and generating the respective control signals. The CPU 8 transmits the generated control signals to the respective components of the combination weighing device 1 through the aforementioned interface and the aforementioned bus wires for operating the components in response to the control signals. In particular, the CPU 8 controls the driving mechanism 51 thereby mainly implementing the transport quantity control element in the present invention.

The memory device 11 preserving various data corresponds to a read/write hard disk or the like, while this memory device 11 may alternatively be formed by a device such as a CD-ROM reader or a card reader employing a portable recording medium (a CD-ROM or a memory card).

Figure 2:
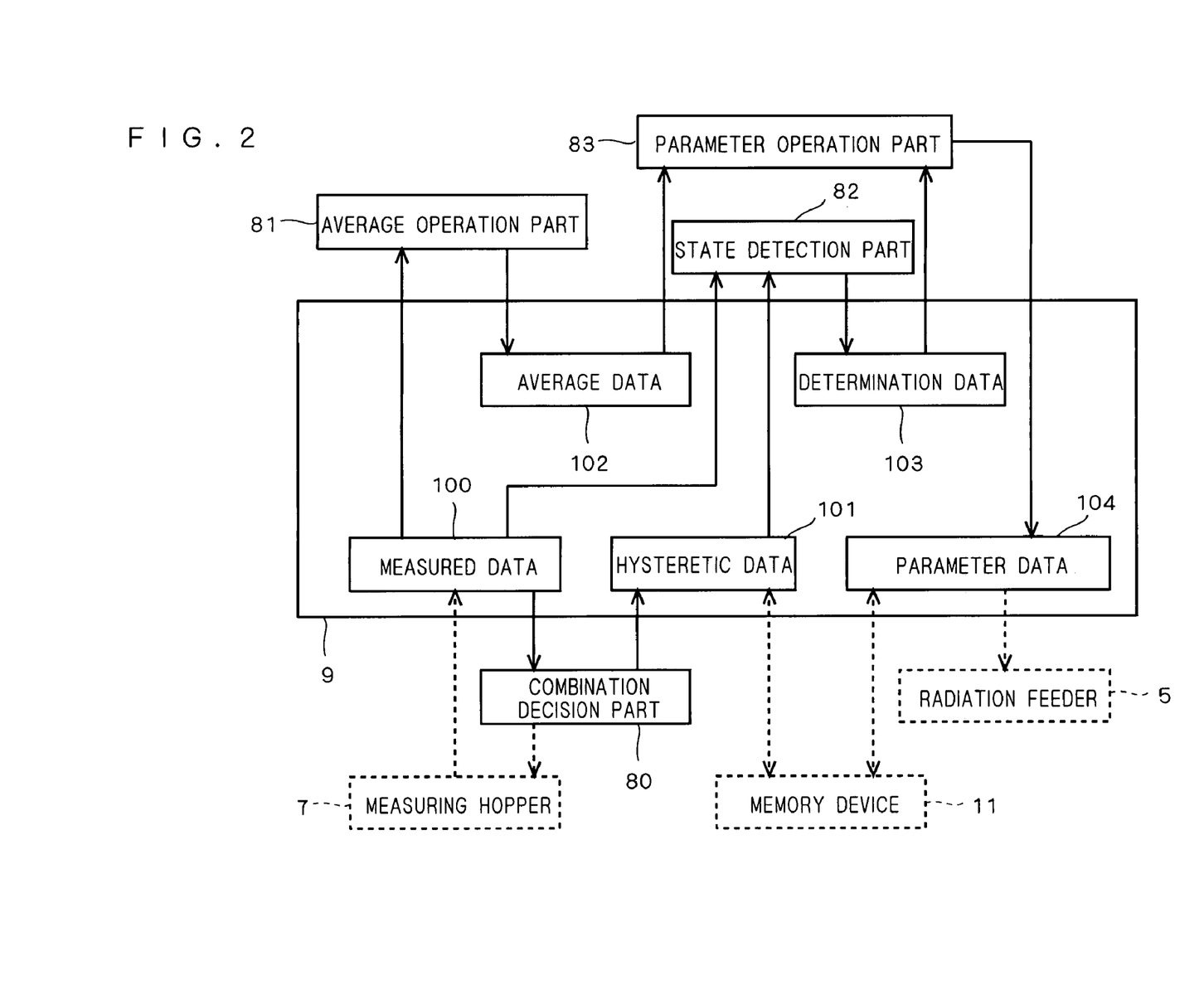
FIG. 2 is a block diagram showing a functional structure implemented by a CPU.

FIG. 2 is a block diagram showing a functional structure mainly implemented by the CPU 8. In the combination weighing device 1, the CPU 8 operates according to the aforementioned program thereby implementing the functional structure formed by a combination decision part 80, an average operation part 81, a state detection part 82 and a parameter operation part 83 shown in FIG. 2. While FIG. 2 illustrates the functional structure as to only each radiation feeder 5 and each measuring hopper 7, the combination weighing device 1 according to the first preferred embodiment individually performs similar processing as to all radiation feeders 5 and all measuring hoppers 7.

The combination decision part 80 selects a combination of the measuring hoppers 7 exhibiting a total weight of bagged objects closest to the target measured value Tg on the basis of measured data 100. The measured data 100 is generated on the basis of data output from the measuring hoppers 7 for indicating the weight (corresponding to the transport quantity of each radiation feeder 5) of a group of the objects introduced into each measuring hopper 7.

The combination decision part 80 also operates the on-off gates of the selected measuring hoppers 7 for introducing the objects held therein into the aforementioned collecting chute. The combination decision part 80 further adds up the weights of the groups having been introduced into the selected measuring hoppers 7 thereby obtaining the total weight (hereinafter referred to as "bagged weight") of the objects introduced into the collecting chute and generating hysteretic data 101. The hysteretic data 101, including results of measurement in the combination weighing device 1 etc., includes a bagged weight every cycle, identifiers of the measuring hoppers 7 performing introduction etc., for example. The memory device 11 properly receives and stores the hysteretic data 101.

Referring to the measured data 100, the average operation part 81 operates an average (hereinafter referred to as "average introduced weight Xa") and standard deviation σ of the weights of the groups introduced by one of the measuring hoppers 7 by a prescribed frequency. The term "prescribed frequency" indicates not an operation cycle number in the combination weighing device 1 but an introduction cycle number for a certain measuring hopper 7 introducing objects into the collecting chute. Therefore, the average operation part 81 obtains the average introduced weights Xa and the standard deviation a as to each measuring hopper 7 introducing objects by the prescribed frequency while the combination weighing device 1 performs 50 cycles of operations, for example, by this prescribed frequency.

The average operation part 81 operates the average introduced weights Xa and the standard deviations σ every prescribed frequency as to all measuring hoppers 7 for generating average data 102. In other words, the average operation part 81 mainly corresponds to the operation element in the present invention. The state detection part 82 described later determines as to whether or not each measuring hopper 7 has performed introduction by the prescribed frequency, and indicates the result of this operation in determination data 103. In other words, the average operation part 81 refers to the determination data 103 in order to generate the aforementioned average data 102.

The average operation part 81 also has a function of operating average weight change ΔX by operating the difference between the obtained average introduced weight Xa and a precedently obtained average introduced weight Xa.

The state detection part 82 checks the transport state of each radiation feeder 5 on the basis of the measured data 100 thereby detecting an overscale transport state or an empty state and generating the determination data 103 indicating the result of this detection. In other words, the state detection part 82 mainly corresponds to the transport state detection element in the present invention. The weight of the group is in excess of an allowable weight (upper limit) in the overscale transport state while the weight of the group is "0" in the empty state.

The state detection part 82 refers to the hysteretic data 101 thereby operating the availability of the combination weighing device 1 and counts the introduction frequency of each measuring hopper 7 for determining whether or not the count has reached a prescribed frequency thereby determining a control period as to each measuring hopper 7. The state detection part 82 also introduces the result of this determination into the determination data 103.

The parameter operation part 83 operates a control parameter Pr on the basis of the average data 102 in response to the result of detection indicated in the determination data 103. The control parameter Pr is employed for controlling driving strength of each driving mechanism 51. The combination weighing device 1 according to the first preferred embodiment can set the control parameter Pr as an individual value every driving mechanism 51 for each radiation feeder 5.

The parameter operation part 83 also generates the parameter data 104 indicating the obtained control parameter Pr. The parameter data 104 is properly output to and stored in the memory device 11.

The combination weighing device 1 according to the first preferred embodiment has the aforementioned structure and functions. An operation of the combination weighing device 1 measuring and combining objects by a prescribed quantity (target measured value Tg) is now described. The CPU 8 controls the components of the combination weighing device 1 unless otherwise stated.

Figure 3:
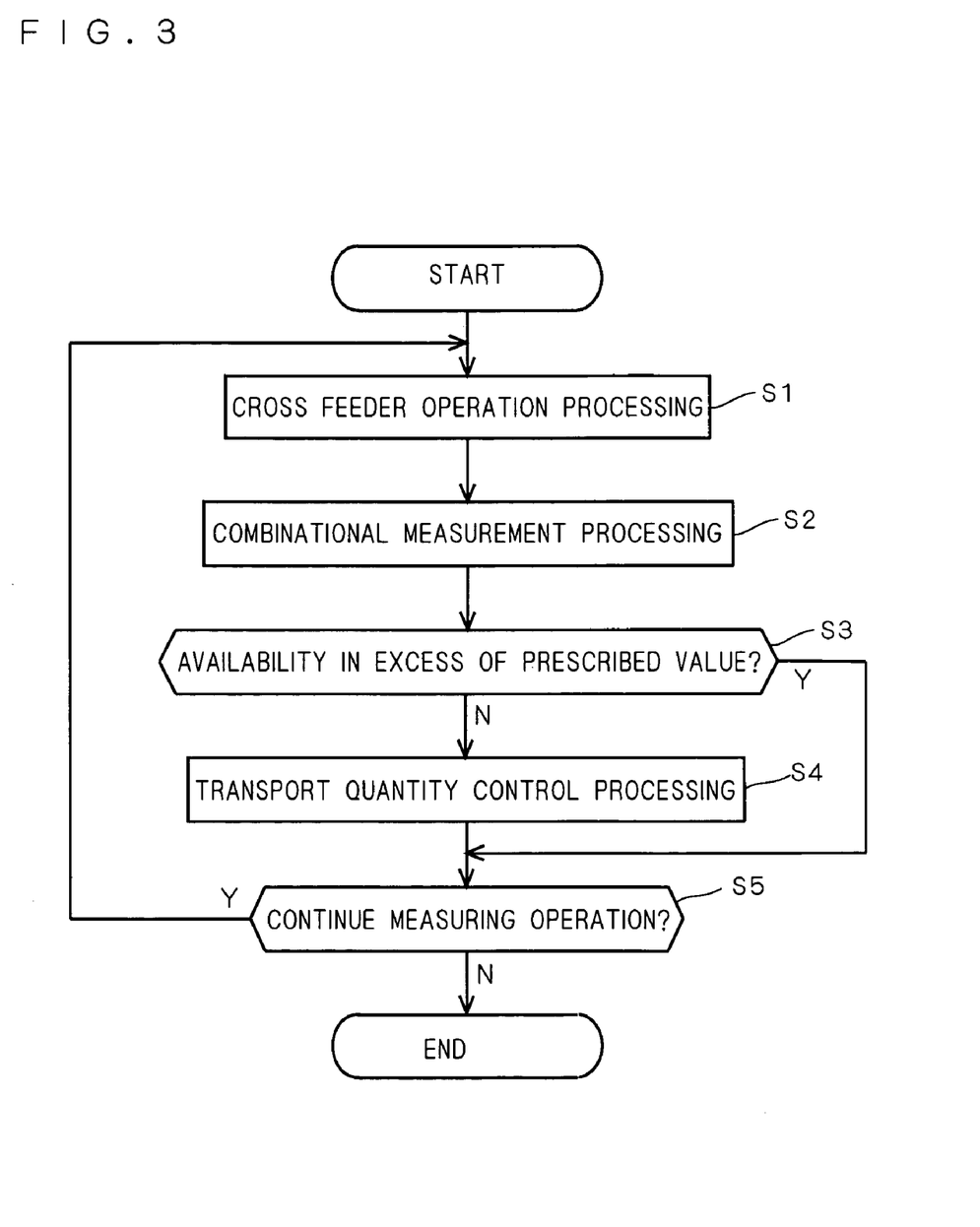
FIG. 3 is a flow chart showing operations of the combination weighing device.

FIG. 3 is a flow chart showing operations of the combination weighing device 1 according to the first preferred embodiment. When starting the measuring operation, the combination weighing device 1 executes prescribed initialization (not shown). In this initialization, the combination weighing device 1 sets initial values such as the target measured value Tg, the target introduction number N, the control parameter Pr for each radiation feeder 5 and the like, and preserves the same in the memory device 11.

Then, the combination weighing device 1 operates the cross feeder 2 for supplying objects to the dispersion feeder 3 (step S1). Briefly stated, the combination weighing device 1 drives the driving mechanism 21 for the cross feeder 2 when the driving mechanism 21 is stopped and the dispersed weight measured by the measurer 4 is not more than a lower limit (target dispersed weight), in order to control the cross feeder 2 through the CPU 8. When the driving mechanism 21 is in an OFF state as described above, the dispersion feeder 3 is supplied with no objects, and the dispersed weight is reduced. When the dispersed weight is reduced below the target dispersed weight in such a situation, the combination weighing device 1 restarts supplying objects to the dispersion feeder 3 so that the quantity of the objects on the dispersion feeder 3 is sufficient.

When the driving mechanism 21 is driven and the dispersed weight is in excess of an upper limit, on the other hand, the combination weighing device 1 stops the driving mechanism 21. When the driving mechanism 21 is in an ON state as described above, the dispersion feeder 3 is supplied with objects, and the dispersed weight is increased. When the dispersed weight exceeds the upper limit in such a situation, the combination weighing device 1 stops supplying objects to the dispersion feeder 3 so that no objects are oversupplied onto the dispersion feeder 3.

Thus, the combination weighing device 1 performs on-off control on the cross feeder 2 with the target dispersed weight and the upper limit thereby controlling the quantity of the objects supplied to the dispersion feeder 3. More specifically, the combination weighing device 1 executes the step S1 in parallel with subsequent processing.

Then, the combination weighing device 1 executes combinational measurement processing (step S2). In the combinational measurement processing at the step S2, the combination weighing device 1 drives the dispersion feeder 3 while vibrating/driving each radiation feeder 5 (driving mechanism 51) by one cycle on the basis of the control parameter Pr set in the parameter data 104.

Thus, the combination weighing device 1 dispersively supplies the objects from the dispersion feeder 3 to each radiation feeder 5 and introduces the objects from each radiation feeder 5 into the corresponding pool hopper 6. The objects introduced from each radiation feeder 5 into the corresponding pool hopper 6 due to this vibration/driving for one cycle constitute each group. At this time, the combination weighing device 1 vibrates/drives only radiation feeders 5 corresponding to empty measuring hoppers 7 among all radiation feeders 5.

When completely driving the dispersion feeder 3 and the radiation feeders 5 for one cycle, the combination weighing device 1 opens the on-off gates of the pool hoppers 6 receiving the group of objects from the radiation feeders 5. Thus, the combination weighing device 1 introduces the groups of objects held in the pool hoppers 6 into the corresponding measuring hoppers 7. Thus, the combination weighing device 1 newly introduces the groups of objects into only the empty measuring hoppers 7.

Then, each measuring hopper 7 newly receiving the group of objects measures the weight of the introduced group and outputs the result of this measurement to the CPU 8. The CPU 8 generates the measured data 100 on the basis of the weight of the group obtained every measuring hopper 7. As to a measuring hopper 7 newly outputting a result of measurement, the CPU 8 generates the measured data 100 in this cycle on the basis of this output. As to the remaining measuring hoppers 7, the CPU 8 generates the measured data 100 in this cycle on the basis of weights of groups theretofore indicated in the measured data 100.

When the CPU 8 completely measures the weight of the group introduced into each measuring hopper 7 and generates the measured data 100 in this cycle, the combination decision part 80 determines a combination of groups introduced into the measuring hoppers 7 exhibiting a total weight (bagged weight) closest to the target measured value Tg. The combination decision part 80 further selects the measuring hoppers 7 performing introduction in this cycle on the basis of the result of the determination, and outputs a control signal to the selected measuring hoppers 7 for instructing the same to open the on-off gates. Thus, the selected measuring hoppers 7 introduce a plurality of groups of objects into the collecting chute so that the groups of objects are bagged through the discharge chute.

The combination decision part 80 further obtains the bagged weight, generates the hysteretic data 101 and terminates the combinational measurement processing at the step S2.

When the combination decision part 80 terminates the combinational measurement processing, the state detection part 82 determines whether or not the availability of the combination weighing device 1 is in excess of a prescribed value on the basis of the hysteretic data 101 (step S3). The combination weighing device 1 skips transport quantity control processing at a step S4 if the availability is in excess of the prescribed value, while executing the transport quantity control processing if the availability is less than the prescribed value.

Figure 4:
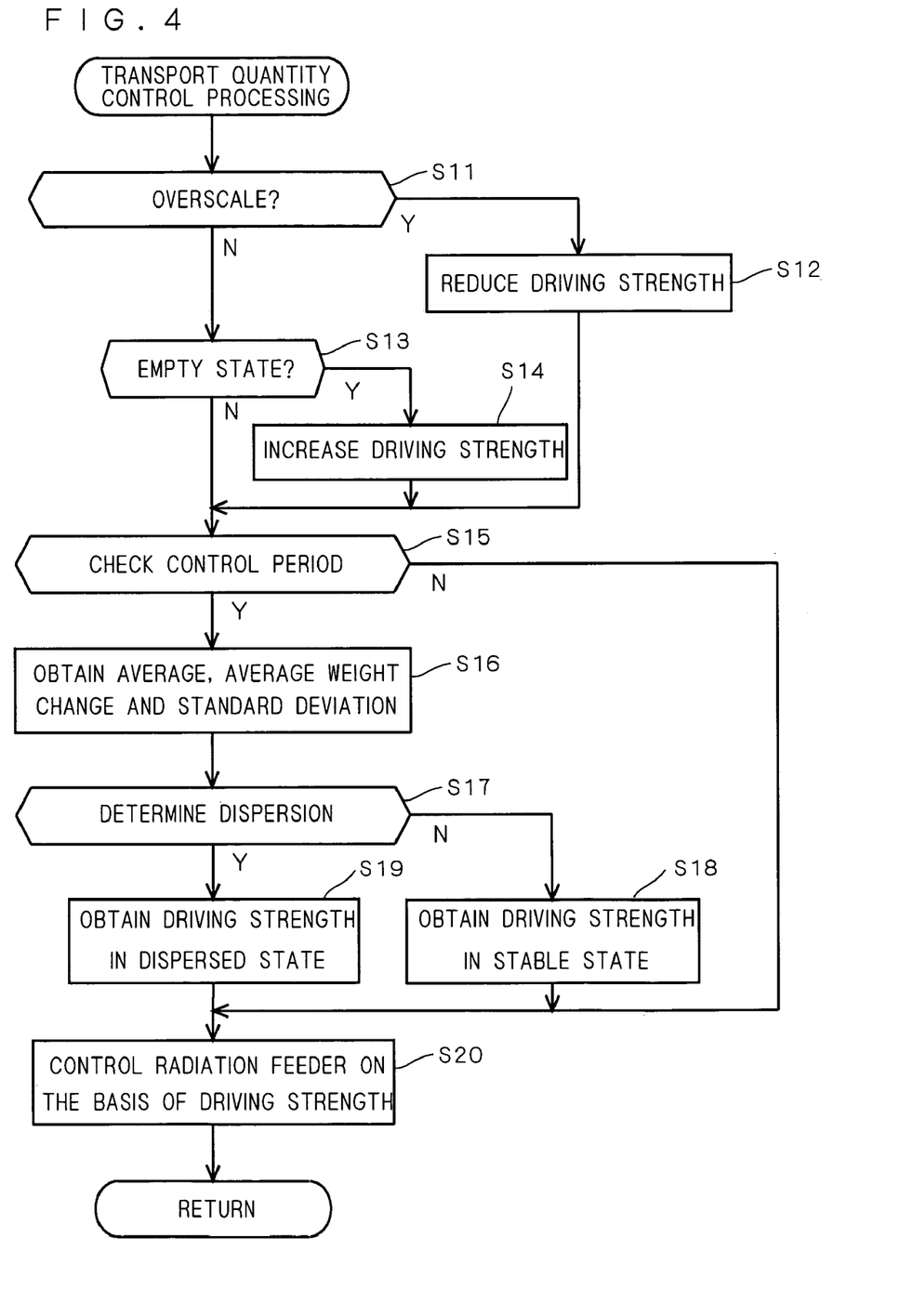
FIG. 4 is a flow chart showing transport quantity control processing.

FIG. 4 is a flow chart showing the transport quantity control processing of the combination weighing device 1 according to the first preferred embodiment in detail. The combination weighing device 1 individually performs the transport quantity control processing as to each radiation feeder 5 and each measuring hopper 7. In the transport quantity control processing, the state detection part 82 refers to the measured data 100 thereby determining whether or not the transport state of the measuring hopper 7 is overscale and generating the determination data 103 from the result of this determination (step S11).

When the determination data 103 indicates that the transport state is overscale, the parameter operation part 83 operates a new control parameter Pr for the radiation feeder 5 for reducing the driving strength by a constant quantity (step S12). The new control parameter Pr can be obtained according to the following equation (1), for example, where Kp represents a constant satisfying Kp<1:

$$Pr=Kp \times Pr \quad (1)$$

If the transport state is not overscale (NO at the step S11), on the other hand, the state detection part 82 further determines whether or not the radiation feeder 5 is empty and generates the determination data 103 from the result of this determination (step S13).

When the determination data 103 indicates that the radiation feeder 5 is empty, the parameter operation part 83 operates a new control parameter Pr for increasing the driving strength for the radiation feeder 5 by a constant ratio (step S14). The new control parameter Pr can be obtained according to the following equation (2), for example, where Kq represents a constant satisfying Kq>1:

$$Pr=Kq \times Pr \quad (2)$$

Thus, the state detection part 82 of the combination weighing device 1 detects an overscale state or an empty state every radiation feeder 5 on the basis of the weight of the group (the transport quantity of the radiation feeder 5) measured by the measuring hopper 7 for making the parameter operation part 83 operate the control parameter Pr in response to the result of this detection. In other words, the combination weighing device 1 maintains the present circumstances as to each normally operating radiation feeder 5 according to the current control parameter Pr, and can set a new control parameter Pr as to each abnormally operating radiation feeder 5. Thus, the combination weighing device 1 can reduce useless control and operations in the CPU 8, thereby improving control efficiency.

Then, the combination weighing device 1 checks a control period as to each measuring hopper 7 (step S15). More specifically, the state detection part 82 refers to the hysteretic data 101 for determining whether or not each measuring hopper 7 has performed introduction by a prescribed frequency. The state detection part 82 determines that this does not correspond to the control period as to any measuring hopper 7 having not performed introduction by the prescribed frequency (NO at the step S15). In this case, the combination weighing device 1 skips processing at steps S16 to S19 as to this measuring hopper 7.

On the other hand, the state detection part 82 determines that this corresponds to the control period as to any measuring hopper 7 already having performed introduction by the prescribed frequency (YES at the step S15). In this case, the average operation part 81 calculates the average introduced weight Xa, the average weight change ΔX and the standard deviation a as to this measuring hopper 7 (step S16).

Figure 5:
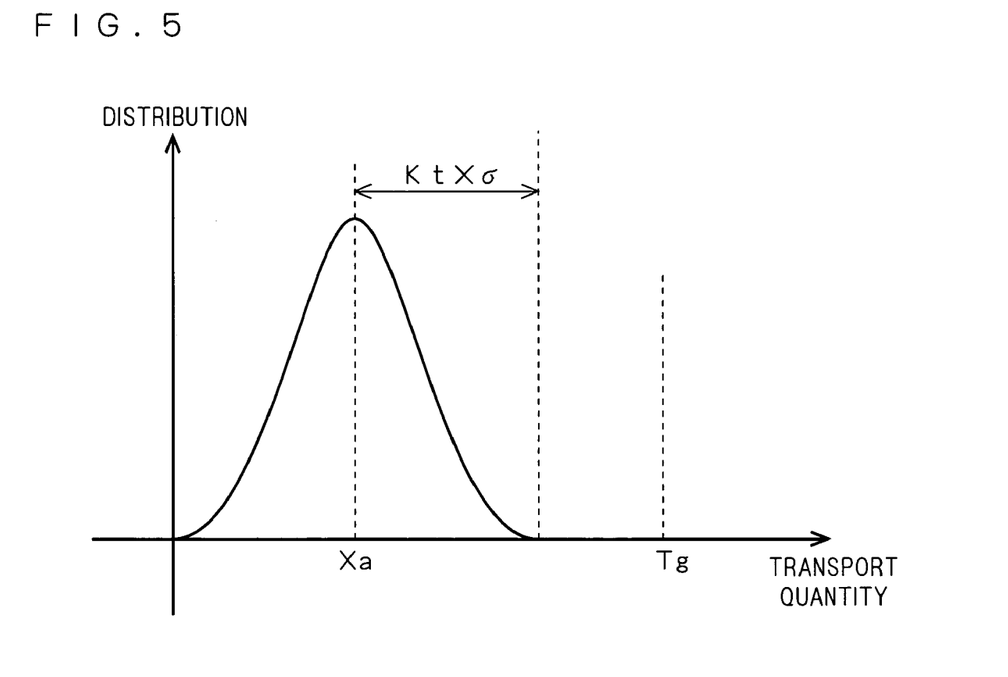
FIG. 5 illustrates stable distribution of transport quantities by a radiation feeder by a prescribed frequency.
Figure 6:
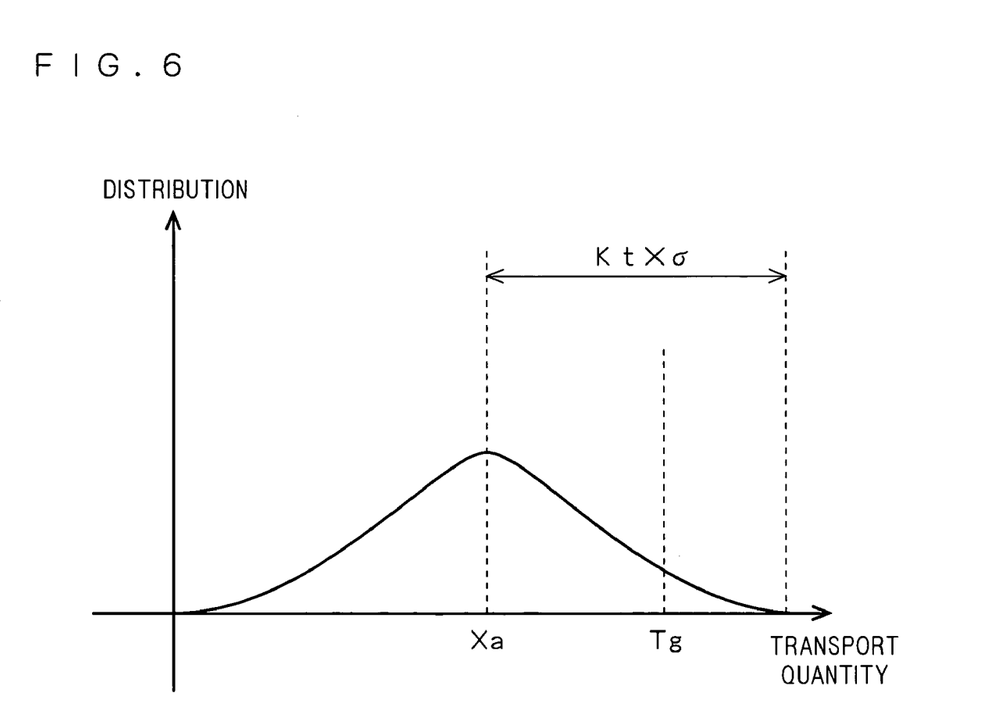
FIG. 6 illustrates dispersed distribution of the transport quantities by the radiation feeder by the prescribed frequency.

FIG. 5 illustrates stable distribution of transport quantities (weights of groups of objects) transported by the radiation feeder 5 by the prescribed frequency. FIG. 6 illustrates dispersed distribution of transport quantities transported by the radiation feeder 5 by the prescribed frequency. In the following description, symbol Kr denotes a range coefficient.

Similarly to the conventional device, the combination weighing device 1 according to the first preferred embodiment obtains an ideal introduction quantity (hereinafter referred to as "target introduction value Tt") for each measuring hopper 7 by dividing the target measured value Tg by the target introduction number N. When the transport quantity of each group of objects transported to each measuring hopper 7 is equal to the target introduction value Tt, therefore, the probability of presence of combinations of the measuring hoppers 7 for attaining the target measured value Tg is most increased. In other words, it is possible to improve operation efficiency of the combination weighing device 1 by controlling the driving strength for each radiation feeder 5 so that the average introduced weight Xa in introduction of a prescribed frequency coincides with the target introduction value Tt.

If controlling the average introduced weight Xa to coincide with the target introduction value Tt when the transport quantities of the groups transported by the radiation feeders 5 are dispersed as shown in FIG. 6, however, the probability of presence of combinations of the measuring hoppers 7 for attaining the target measured value Tg remarkably reduces.

Therefore, the combination weighing device 1 according to the first preferred embodiment determines whether or not the transport quantities of the radiation feeder 5 are stable. If the transport quantities are stable, the combination weighing device 1 controls the radiation feeder 5 so that the average introduced weight Xa coincides with the target introduction value Tt. On the other hand, if the transport quantities are not stable (dispersed), the combination weighing device 1 controls the radiation feeder 5 so that the measuring hopper 7 is not overscale.

The contents of the aforementioned control are now specifically described along operations of the combination weighing device 1. First, the parameter operation part 83 performs dispersion determination as to the transport quantities of the groups transported by the radiation feeder 5 in response to the standard deviation a obtained by the average operation part 81 (step S17). The parameter operation part 83 performs this dispersion determination by determining whether or not the following formula (3) is satisfied, for example:

$$Tt+Kr \times \sigma > Tg \quad (3)$$

The formula (3) is satisfied when the average introduced weight Xa is controlled to coincide with the target introduction value Tt and the maximum value (left part) of the transport quantities exceeds the target measured value Tg. In this case, it is improper to control the average introduced weight Xa to coincide with the target introduction value Tt since the measuring hopper 7 enter overscale states.

When the standard deviation a is sufficiently small and the formula (3) is not satisfied (NO at the step S17), the combination weighing device 1 can regard the transport quantities of the radiation feeder 5 as relatively stable. Therefore, the parameter operation part 83 obtains driving strength for the stable radiation feeder 5 (step S18). In other words, the parameter operation part 83 obtains the driving strength for the radiation feeder 5 so that the average introduced weight Xa coincides with the target introduction value Tt.

Figure 7:
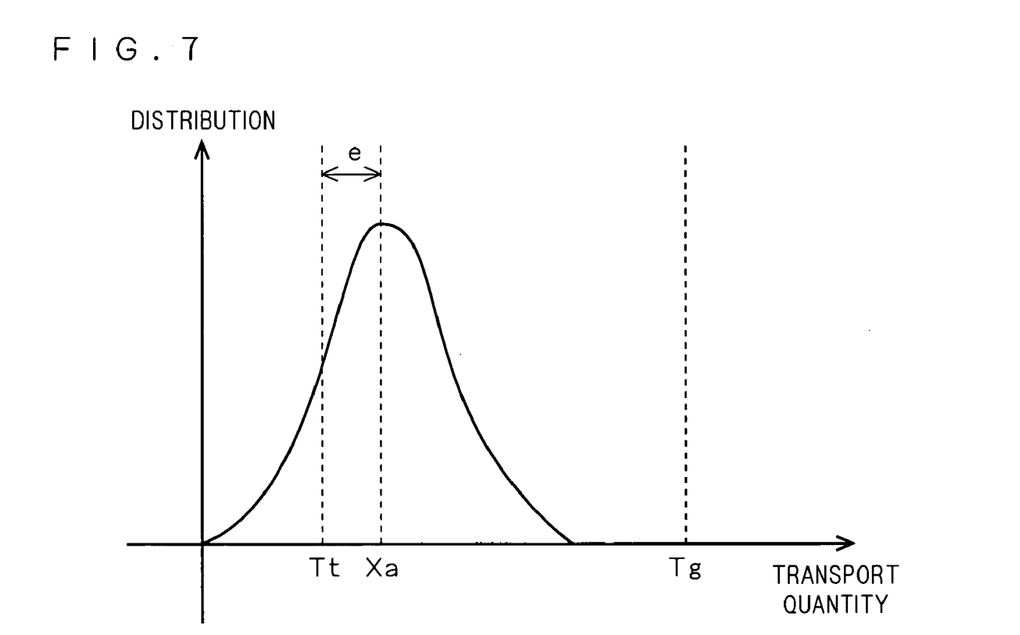
FIG. 7 illustrates the concept of transport quantity control in a stable state.

FIG. 7 conceptually illustrates the processing at the step S18. In the processing at the step S18, the parameter operation part 83 obtains the deviation e between the average introduced weight Xa and the target introduction value Tt according to the following equation (4):

$$e=Tt-Xa \quad (4)$$

On the basis of the deviation e and the average weight change ΔX, the parameter operation part 83 obtains a manipulated variable ΔPr for the radiation feeder 5 necessary for making the average introduced weight Xa coincide with the target introduction value Tt while referring to a previously set fuzzy table, and obtains a new control parameter Pr in a stable state according to the following equation (5):

$$Pr = Pr + \Delta Pr \quad (5)$$

If the formula (3) is satisfied and it can be regarded that the transport quantities of the groups transported by the radiation feeder 5 are dispersed (YES at the step S17), on the other hand, the parameter operation part 83 obtains driving strength for the radiation feeder 5 in the dispersed state (step S19). In other words, the parameter operation part 83 obtains the driving strength for the radiation feeder 5 so that the measuring hopper 7 is not overscale.

Figure 8:
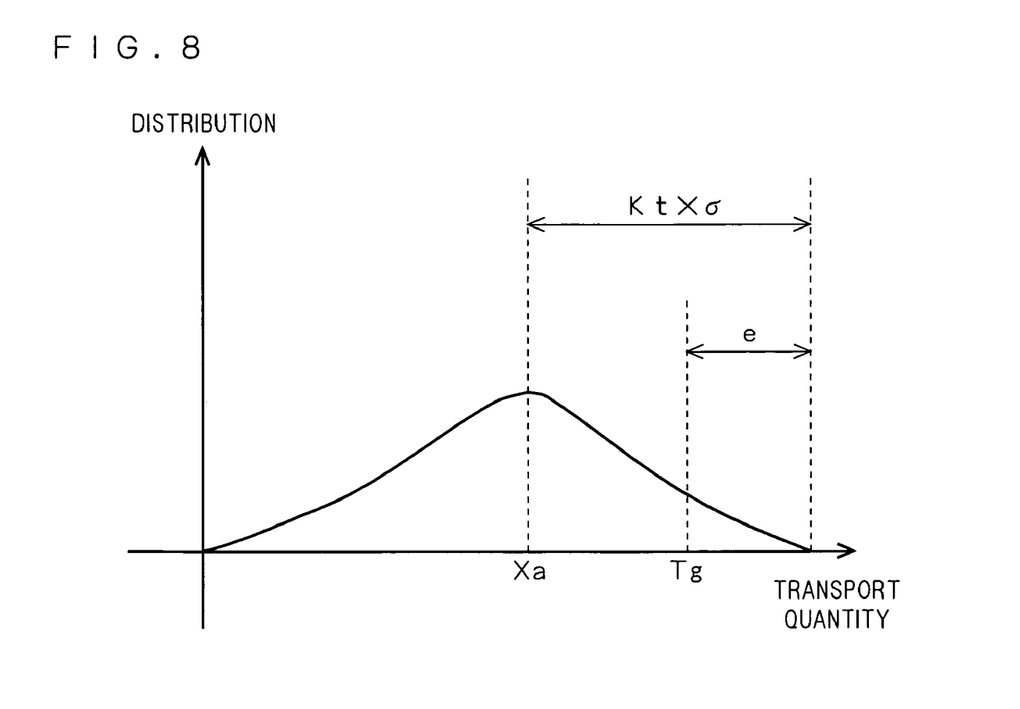
FIG. 8 illustrates the concept of transport quantity control in a dispersed state.

FIG. 8 conceptually illustrates the processing at the step S19. In the processing at the step S19, the parameter operation part 83 obtains the deviation e between the target measured value Tg and the maximum value of the transport quantities of the groups transported to the measuring hopper 7 according to the following equation (6):

$$e = Tg - (Xa + Kr \times \sigma) \quad (6)$$

On the basis of the deviation e and the average weight change $\Delta X$, the parameter operation part 83 obtains the manipulated variable $\Delta Pr$ for the radiation feeder 5 while further referring to the previously set fuzzy table, and obtains the control parameter Pr for the radiation feeder 5 in the dispersed state according to the equation (5).

When the parameter operation part 83 completely operates the new control parameters Pr (step S12, S14, S18 or S19) for all radiation feeders 5 necessarily to change the control parameter Pr, the combination weighing device 1 controls each radiation feeder 5 with the driving strength expressed by the new control parameter Pr (step S20). More specifically, the combination weighing device 1 performs processing of storing the newly obtained control parameters Pr as the parameter data 104 at the step S20. The combination weighing device 1 executes the processing of driving each radiation feeder 5 in the combinational measurement processing at the step S2 (FIG. 3).

Thus, the combination weighing device 1 according to the first preferred embodiment, making control so that each weight of the group of objects transported to each measuring hopper 7 reaches the target introduction value Tt if the transport quantities transported by the radiation feeders 5 are relatively stable, can control the transport quantities to a state exhibiting the highest probability of presence of combinations for attaining the target measured value Tg.

If the transport quantities transported by the radiation feeder 5 are dispersed, on the other hand, the combination weighing device 1 controls so that the each weight of the group transported to each measuring hopper 7 does not reach the target introduction value Tt but is reduced below the target measured value Tg. Therefore, the combination weighing device 1 can inhibit the measuring hoppers 7 from entering overscale states. Thus, the combination weighing device 1, capable of preventing the measuring hoppers 7 from entering unusable states, can prevent reduction of the probability of presence of combinations of the measuring hoppers 7 for attaining the target measured value Tg.

In other words, the parameter operation part 83 selects one of at least two operation techniques (the equations (4) and (6)) for operating each control parameter Pr in response to the standard deviation $\sigma$ of the transport quantities obtained by the average operation part 81 thereby enabling control responsive to the state of the combination weighing device 1. Therefore, it is possible to improve measurement efficiency.

When terminating the processing at the step S20, the combination weighing device 1 terminates the transport quantity control processing, returns to the processing shown in FIG. 3 and determines whether or not to continue the measuring operation (step S5). The combination weighing device 1 repetitively executes the processing at the steps S1 to S5 in order to continue the measuring operation, while terminating the processing in order not to continue the measuring operation.

As hereinabove described, the combination weighing device 1 according to the first preferred embodiment determines the transport states (dispersed states) of each radiation feeder 5 in response to the standard deviation 6 of the transport quantities for the groups of objects transported by the radiation feeder 5 and selects one of at least two operation techniques on the basis of the result of this detection for operating the control parameter. Therefore, the combination weighing device 1 can perform control in response to its state, thereby efficiently performing measurement.

Further, the state detection part 82 checks the transport states of each radiation feeder 5, detects overscale states or empty states of each measuring hopper 7 and makes the parameter operation part 83 operate the control parameters Pr in response to the result of this detection. In other words, the combination weighing device 1 can improve control efficiency by maintaining the present circumstances as to normally operating radiation feeders 5.

While the combination weighing device 1 according to the first preferred embodiment controls the vibration strength for each radiation feeder 5 with the control parameter Pr thereby controlling the transport quantities, it is also possible to control the transport quantities by controlling a vibration time for each radiation feeder 5 since the transport quantities also depend on the vibration time.

Figure 9:
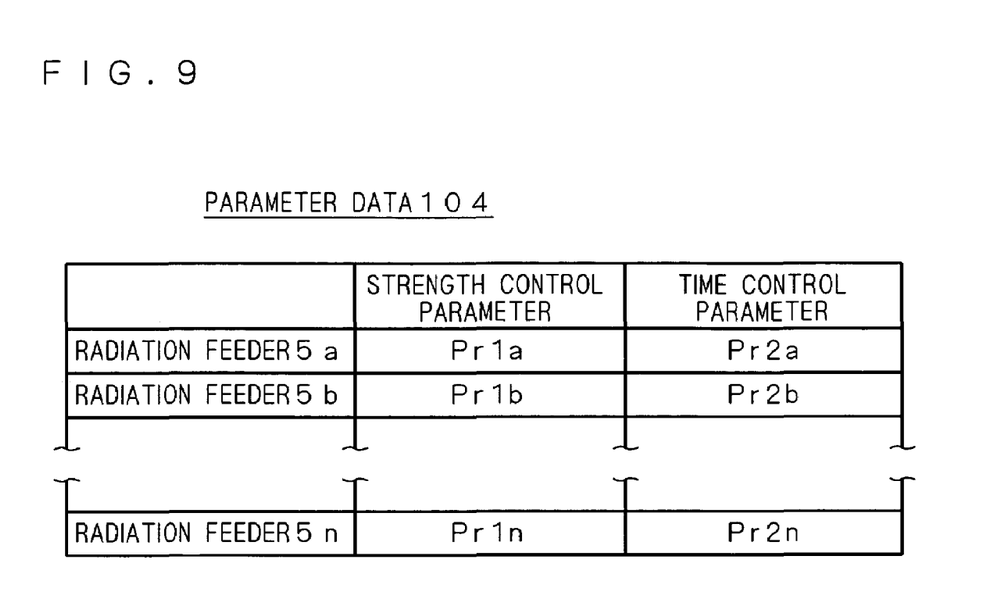
FIG. 9 illustrates the structure of parameter data generated by a parameter operation part of a combination weighing device according to a second preferred embodiment of the present invention.

FIG. 9 illustrates the structure of parameter data 104 generated by a parameter operation part 83 of a combination weighing device 1 according to a second preferred embodiment of the present invention structured on the basis of such a principle. In the second preferred embodiment, the parameter data 104 is constituted of strength control parameters Pr1 similar to the control parameters Pr in the first preferred embodiment and time control parameters Pr2 for controlling driving times for respective radiation feeders 5. Numerals 5a to 5n denote the radiation feeders 5 similar in structure to each other. The combination weighing device 1 according to the second preferred embodiment has functions and a structure similar to those of the combination weighing device 1 according to the first preferred embodiment except the structure of the parameter data 104 generated by the parameter operation part 83.

In the combination weighing device 1 according to the second preferred embodiment, the parameter operation part 83 operates the strength control parameters Pr1 according to a technique similar to the technique of obtaining the control parameters Pr in the first preferred embodiment (step S12, S14, S18 or S19 in FIG. 4). The parameter operation part 83 further operates the time control parameters Pr2 when obtaining the strength control parameters Pr1. The parameter operation part 83 can employ a mathematical technique similar to that for obtaining the strength control parameters Pr1, for example, in order to obtain the time control parameters Pr2.

Also when employing a driving mechanism (base 31) having a narrow span of adjustable range for driving strength, it is possible to control a discharge quantity from a dispersion feeder 3 over a wide range by controlling driving of the radiation feeders 5 in combinational measurement processing with the obtained strength control parameters Pr1 and the obtained time control parameters Pr2.

Thus, the combination weighing device 1 according to the second preferred embodiment can also attain effects similar to those of the combination weighing device 1 according to the first preferred embodiment. Further, the combination weighing device 1 according to the second preferred embodiment can control transport quantities of groups transported by the radiation feeders 5 over a wider range as compared with a case of controlling only driving strength by performing control with two types of parameters, i.e., the driving strength and the driving time.

While the CPU 8 controls the components of the combination weighing device 1 according to the software program in the aforementioned first and second preferred embodiments, a dedicated circuit may be provided for entirely or partially implementing these functions in a hardware manner.

While the ROM 10 previously stores and runs the program in the aforementioned first and second preferred embodiments, the present invention is not restricted to this but the program may alternatively be previously loaded into the memory device 11 from a CD-ROM or the like, for example, and stored therein to be thereafter run.

While the invention has been shown and described in detail, the foregoing description is in all aspects illustrative and not restrictive. It is therefore understood that numerous modifications and variations can be devised without departing from the scope of the invention.

What is claimed is:

1. A combination weighing device for weighing respective groups of objects to determine a partial combination of the groups of objects having a total weight approximating to a target combination weight, said device comprising:
   a plurality of transport elements controlled in accordance with prescribed parameters to transport respective groups of objects;
   a transport quantity measuring element measuring weights of respective groups of objects transported by said plurality of transport elements; and
   a transport quantity control element controlling the plurality of transport elements via the prescribed parameters to control said weights of respective groups of objects, said transport quantity control element comprising:
   an operation element obtaining an average and standard deviation of weights of respective groups of objects corresponding to a prescribed frequency for each transport element on the basis of weights of respective groups of objects corresponding to said prescribed frequency measured by said transport quantity measuring element, and
   a parameter operation element determining said prescribed parameters on the basis of said average and said standard deviation of each transport element obtained by said operation element, said parameter operation element selecting one of at least two different computation techniques to determine the prescribed parameter of each transport element in response to said standard deviation obtained by said operation element.

2. The combination weighing device according to claim 1, wherein
   said transport quantity control element controls driving strength for said plurality of transport elements thereby controlling weights of respective groups of objects.

3. The combination weighing device according to claim 1, wherein
   said transport quantity control element controls driving time for said plurality of transport elements thereby controlling weights of respective groups of objects.

4. The combination weighing device according to claim 1, wherein
   said transport quantity control element further comprises:
   a transport state detection element detecting an overscale state or an empty state of each transport quantity measuring element on the basis of said weights of respective groups of objects measured by said transport quantity measuring element;
   and wherein said parameter operation element selecting one of at least two different computation techniques in response to the result of detection of said transport state detection element.

5. A combination weighing device for weighing respective groups of objects to determine a partial combination of the groups of objects having a total weight approximating to a target combination weight, said device comprising:
   a plurality of transport elements controlled in accordance with prescribed parameters to transport respective groups of objects;
   a transport quantity measuring element measuring weights of respective groups of objects transported by said plurality of transport elements;
   means for obtaining an average and standard deviation of weights of respective groups of objects corresponding to a prescribed frequency for each transport element on the basis of weights of respective groups of objects corresponding to said prescribed frequency measured by said transport quantity measuring element; and
   means for selecting one of at least two different computation techniques using the obtained average and the obtained standard deviation to determine the prescribed parameter of each transport element in response to the obtained standard deviation.

6. A combination weighing device comprising:
   a plurality of radiation feeders controlled in accordance with a plurality of prescribed parameters, respectively, to transport a plurality of groups of objects, respectively;
   a plurality of measuring hoppers corresponding, respectively, to the plurality of radiation feeders, each measuring hopper measuring weights of a respective group of objects transported by the corresponding radiation feeder; and
   a transport quantity control element controlling the radiation feeders via the prescribed parameters to control said weights, the transport quantity control element comprising:
   an operation element obtaining an average and standard deviation of weights of respective groups of objects corresponding to a prescribed frequency for each radiation feeder on the basis of weights of groups of objects corresponding to said prescribed frequency measured by the measuring hoppers, and
   a parameter operation element determining said prescribed parameters on the basis of said average and said standard deviation of each radiation feeder obtained by said operation element, said parameter operation element selecting one of at least two different computation techniques to determine the prescribed parameter of each radiation feeder in response to said standard deviation obtained by said operation element.

* * * * *

UNITED STATES PATENT AND TRADEMARK OFFICE
CERTIFICATE OF CORRECTION

PATENT NO.        : 7,064,281 B2                                          Page 1 of 1
APPLICATION NO.   : 10/716448
DATED             : June 20, 2006
INVENTOR(S)       : Toshiharu Kageyama et al.

It is certified that error appears in the above-identified patent and that said Letters Patent is hereby corrected as shown below:

Title page, item (56) References Cited under

OTHER DOCUMENTS

Insert --European Patent Office, Patent Abstract of Japan, Publication No. 04095823, Published March 27, 1992, "Combining/Measuring Apparatus." --

Signed and Sealed this

Twenty-eighth Day of November, 2006

JON W. DUDAS
*Director of the United States Patent and Trademark Office*